(12) United States Patent
Houben et al.

(10) Patent No.: US 11,828,540 B2
(45) Date of Patent: Nov. 28, 2023

(54) CLOSED CYCLE THERMAL ENERGY STORAGE SYSTEM USING THERMOCHEMICAL MATERIAL

(71) Applicants: Technische Universiteit Eindhoven, Eindhoven (NL); Nederlandse Organisatie voor toegepast-natuurwetenschappelijk onderzoek TNO, 's-Gravenhage (NL)

(72) Inventors: Jelle Houben, America (NL); Petrus Adrianus Joseph Donkers, Hilvarenbeek (NL); Hendrik Pieter Huinink, Eindhoven (NL); Sebastiaan Joannes Franciscus Erich, Breda (NL); Olaf Clemens Gerardus Adan, Breda (NL); Mohammed Zuhair Siddiqui, Eindhoven (NL)

(73) Assignees: Technische Universiteit Eindhoven, Eindhoven (NL); Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 446 days.

(21) Appl. No.: 16/640,645

(22) PCT Filed: Aug. 21, 2018

(86) PCT No.: PCT/EP2018/072574
§ 371 (c)(1),
(2) Date: Feb. 20, 2020

(87) PCT Pub. No.: WO2019/038292
PCT Pub. Date: Feb. 28, 2019

(65) Prior Publication Data
US 2020/0355446 A1    Nov. 12, 2020

Related U.S. Application Data

(60) Provisional application No. 62/548,530, filed on Aug. 22, 2017.

(51) Int. Cl.
*F28D 20/00* (2006.01)

(52) U.S. Cl.
CPC ....... *F28D 20/003* (2013.01); *F28D 20/0056* (2013.01); *F28D 2020/0078* (2013.01)

(58) Field of Classification Search
CPC ............... F28D 20/003; F28D 20/0056; F28D 20/0078; F28D 2020/0078; Y02E 60/14
See application file for complete search history.

(56) References Cited

U.S. PATENT DOCUMENTS

| | | | |
|---|---|---|---|
| 9,618,276 | B2 | 4/2017 | Tanguy |
| 2010/0089070 | A1 | 4/2010 | Allgeier |

(Continued)

FOREIGN PATENT DOCUMENTS

| | | | |
|---|---|---|---|
| CN | 105423791 | A | 3/2016 |
| CN | 105651091 | * | 6/2016 |

(Continued)

OTHER PUBLICATIONS

Ferchaud, C. Apr. 20, 2016 Experimental study of salt hydrates for thermochemical seasonal heat storage. https://pure.tue.nl/ws/files/20452083/20160420_Ferchaud.pdf.

(Continued)

*Primary Examiner* — Tho V Duong
(74) *Attorney, Agent, or Firm* — LUMEN PATENT FIRM

(57) ABSTRACT

A closed-cycle thermal energy storage system includes a thermochemical reactor [400] containing a solid thermochemical material, a heat exchanger [402], a fan [406] for creating forced convection of an air/water mixture circulating around the closed cycle, an evaporator/condenser [408], (Continued)

and a pressure control system that includes a pressure sensor [422], a controller [424], and a pump [404]. The pressure control system actively controls the pressure of the air/water mixture to produce a desired temperature difference across the thermochemical reactor [400]. The adjustable pressure control system controls the pressure of the air/water mixture to a first pressure (e.g., between 10 mbar and 1 bar) during a hydration phase and a second pressure (e.g., between 1 bar and 10 bar) during a dehydration phase.

10 Claims, 7 Drawing Sheets

(56) References Cited

U.S. PATENT DOCUMENTS

| 2013/0055736 A1 | 3/2013 | Everett |
| 2015/0107800 A1 | 4/2015 | Tang |

FOREIGN PATENT DOCUMENTS

| WO | WO1991019155 | 12/1991 |
| WO | WO1993012394 | 6/1993 |
| WO | WO2016036242 | 3/2016 |

OTHER PUBLICATIONS

De Jong et al. Thermochemical heat storage—system design issues Energy Procedia 48 (2014) 309-319.

Michel et al. Experimental investigation of an innovative thermochemical process operating with a hydrate salt and moist air for thermal storage of solar energy: global performance. App Ener, Elsevier, 2014, 129,177-186.

Donkers et al. A review of salt hydrates for seasonal heat storage in domestic applications Applied Energy 199, Aug. 1, 2017, pp. 45-68.

Van Essen et al. Characterization of MgSO4 Hydrate for Thermochemical Seasonal Heat Storage. J Solar Energy Eng.Nov. 2009, 131.

Yan et al., Thermochemical heat storage for solar heating and cooling systems. Advances in Solar Heating and Cooling, 491-522. DOI: 10.1016/8978-0-08-100301-5.00018-7.

Thermochemical energy storage technologies for building applications: a state-of-the-art review Int J Low-Carbon Tech (2013) 8 (2): 106-116.

A Thermochemical Heat Storage System for Households, Ch. 2: State-of-Art of Thermochemical Heat Storage Systems.

T. Nonnen, S. Beckert, K. Gleichmann, A. Brandt, B. Unger, H. Kerskes, B. Mette, S. Bonk, T. Badenhop, F. Salg, and R. Glaser, "A Thermochemical Long-Term Heat Storage System Based on a Salt/Zeolite Composite," Chem. Eng. Technol., vol. 39, No. 12, pp. 2427-2434, 2016.

K. Lovegrove, A. Luzzi, M. McCann, and O. Freitag, "Exergy Analysis of Ammonia-Based Solar Thermochemical Power Systems," Sol. Energy, vol. 66, No. 2, pp. 103-115, 1999.

J. Yan and C. Y. Zhao, "Experimental study of CaO/Ca(OH)2 in a fixed-bed reactor for thermochemical heat storage," Appl. Energy, vol. 175, pp. 277-284, 2016.

K. Lim, J. Che, and J. Lee, "Experimental study on adsorption characteristics of a water and silica-gel based thermal energy storage (TES) system," Appl. Therm. Eng., vol. 110, pp. 80-88, 2017.

H. Kreetz and K. Lovegrove, "Theoretical analysis and experimental results of a 1 kWchem ammonia synthesis reactor for a solar thermochemical energy storage system," Sol. Energy, vol. 67, No. 4-6, pp. 287-296, 1999.

* cited by examiner

CLOSED CYCLE THERMAL ENERGY STORAGE SYSTEM USING THERMOCHEMICAL MATERIAL

CROSS-REFERENCE TO RELATED APPLICATIONS

This application is a 371 of PCT application PCT/EP2018/072574 filed Aug. 21, 2018. PCT application PCT/EP2018/072574 claims the benefit of U.S. Provisional application 62/548,530 filed Aug. 22, 2017.

FIELD OF THE INVENTION

The present invention relates generally to thermal energy storage systems. More specifically, it relates to thermal energy storage systems using thermochemical materials.

BACKGROUND OF THE INVENTION

Currently society is moving from carbon-based to more renewable energy sources in order to become less dependent on fossil fuels. A dominant part of the energy consumption of European residential sector is related to domestic space heating and hot tap water generation. A cleaner sourcing of this part of the energy sector will have a large impact on the carbon production. For generation of carbon-free heat, new energy production techniques must be implemented, the majority of which are based on capturing solar radiation. However, solar radiation fluctuates on different time scales, i.e., hourly, daily, and seasonally. The power generated fluctuates, resulting in a variable and unpredictable supply of heat. For matching heat demand and supply, heat storage systems that account for the timescale of radiation fluctuations are required.

A promising heat storage concept is based on a thermochemical reaction, which was suggested by Goldstein in the 1960s and has gained interest recently. The solid materials involved in these reactions are called thermochemical materials (TCMs), which involve a chemical reaction and sorption. TCM-based heat storage has several advantages compared to techniques like sensible heat storage and techniques using phase change materials. These advantages include nearly loss-free storage period and high energy density.

There are a variety of TCMs suitable for TCM heat storage systems, a common example being salt/salt-hydrate. A gas-solid equilibrium reaction for a salt/salt-hydrate TCM can be represented by:

$$A(s)+B(g) \leftrightarrow A\cdot B(s)+\text{heat}, \qquad (1)$$

wherein A·B is a solid salt complex made by combining a salt A(s) and reactive gas B(g). In the current literature, reactive gas B is considered to be $H_2O$, $NH_3$ or $CH_3OH$. The amount of reactive gas B inside salt complex A·B is called the loading of the salt. The formation reaction of the salt complex A·B is exothermic, i.e., it produces energy that can be used for heating purposes. The enthalpy of this formation reaction is $\Delta H<0$. The reverse decomposition reaction of A·B is endothermic, $\Delta H>0$ thus costs energy. This happens during periods of excess of heat. The equilibrium reaction in Eq. 1 implies that the maximum loading of a salt at a temperature T is determined by the vapor pressure of B(g).

FIG. 1A shows a schematic illustrating such a TCM heat storage reaction. The TCM 100 has two states, a salt complex 102 and a salt 104. The TCM charging 106 involves the absorption of heat 108 by the TCM 100 and the release of water 110. The charging is thus also referred to as dehydration. The TCM discharging 112 involves the release of heat 114 by the TCM 100 and the sorption of water 116. The discharging is thus also referred to as hydration. Discharging and charging state diagrams are shown in FIG. 1B and FIG. 1C, respectively. The main criteria of success for such storage technique in for buildings are: high efficient energy density, cost efficiency (short payback time), safety, and durability.

For conventional heat storage based on TCMs, two main concepts are generally considered: 1) closed systems which store their own water and operate at vacuum pressures equal to the water vapor pressure at the condenser/evaporator (e.g., at 7.5° C. the pressure 10 mbar); and 2) open systems which exchange water with the environment and operate at constant atmospheric pressure. A schematic drawing for both concepts is given in FIG. 2. The TCM 200 in an open system 202 does not store its own water, but exchanges water with a water source 204 in the environment outside the system, which operates at constant atmospheric pressure. In a closed system 206 the water source 204 is included inside the system, which operates at vacuum pressure.

In case of a closed system 206, both compartments 200, 204 are part of the system and all water necessary for the hydration/dehydration reactions is stored within the system. Consequently, this means a large system size, and thus an effective decrease of the overall energy storage density. The conventional closed system design has high demands on vacuum level (~10 mbar) and purity of the TCM. A small amount of non-condensable gasses will reduce the power or even stop the hydration or dehydration process in the reactor completely as a result of accumulation of non-condensable gasses at the condensation interface. In addition, a traditional closed system is expensive and has a large environmental footprint as a result of the large amount of material in the heat exchanger in direct contact with the TCM.

In the case of an open system 202, the water is not stored in the system itself, but externally released/supplied to the system as needed for TCM dehydration/hydration. A conventional open storage design is less demanding on system level and is cost effective, but it cannot reach high output temperatures, as the heat capacity is too large for the gas delivering the vapor (needed for the reaction to release the heat) to fully heat-up, causing low output temperatures, in case of a low temperature cold source is used.

Current TCM-based heat storage system designs have shortcomings that hamper the introduction of heat storage with TCMs, such as energy density, temperature output and system/material demands. There is thus a need for improved TCM-based heat storage systems.

SUMMARY OF THE INVENTION

In one aspect, the invention provides a new design for a thermal energy storage system using a thermochemical material (TCM). In a preferred embodiment, it is a closed cycle system in which a TCM reactor containing a TCM is separated in the cycle from the heat exchanger. The system operates with forced convection of air/water mixture at a controlled pressure that varies between a reduced pressure and an overpressure, tuned to produce desired temperature difference across the TCM reactor. The system may be tuned or calibrated using measurements of water absorbed by the reactor. The system does not require high vacuum (i.e., pressures below 10 mbar) and associated complexity of conventional closed systems. Operation with forced convection of gas and pressure control allows tuning of desired output temperature.

The TCM may be any solid TCM, such as salts (hydrates/ammoniates/methanol complexes), molecular sieves (zeolites), metal organic frameworks (MOFs), silicagel, or activated alumina. The reduced pressure is a pressure below 1 atmosphere, while the overpressure is a pressure above one atmosphere. The specific pressure will depend on the choice of particular TCM. For example, in one embodiment the reduced pressure is 200-400 mbar and the overpressure is 10 bar by an evaporator/condenser at 10° C.

In contrast with the present invention, conventional TCM energy storage systems include only open systems (exchanging water with the environment and operating at atmospheric pressure) or traditional closed systems (storing their own water and operating at high vacuum). Embodiments of the present invention do not operate at constant pressures of high vacuum or atmospheric pressure, but have active control of the system pressure in order to control the temperature difference across a TCM reactor. They may optionally be calibrated using measurements of partial pressure of $H_2O$. Embodiments have an adjustable pressure system with forced convection of the gas.

This combination of inventive features yields a new class of TCM heat storage systems which has advantages over conventional open and closed systems. In embodiments of the present invention, the temperature increase of the gas over the reactor bed can be actively controlled by changing the gas pressure in the reactor system. The gas is blown actively through the reactor and presence of non-condensable gasses will not affect the performance of the system. In addition, there are lower technical demands on the vacuum system as the pressure in the range of 10 mbar to 10 bar (absolute pressure) can be maintained by periodic and/or controlled pumping. Forced convection is used to avoid blocking of the evaporator/condenser or reactor bed by non-condensables. In addition, during dehydration the water is transported by an increased pressure of the carrier gas (i.e., pressure more than 1 bar). This decreases the temperature step over the reactor bed, as the same amount of energy is supplied. This smaller temperature step will decrease heat losses within the system and the volume flow can be reduced. The temperature step over the reactor can be controlled actively by varying the pressure of the reactor, based on the desired input and output temperature. The system may be calibrated by measuring the water vapor content and temperature step at the output side of the bed.

Embodiments of the invention may enjoy one or more of the following advantages:

The temperature increase/decrease of the gas over the reactor bed during hydration/dehydration can be actively controlled by changing the vapor pressure in the reactor system. Pressures in the range of 10 mbar to 10 bar (absolute pressure) can be maintained by periodic pumping.

Decreased pressure drop over reactor and density of the gas, coefficient of performance (COP) increases compared to open systems at low pressures.

Decreased flow rates at pressures above 1 bar, coefficient of performance (COP) increases compared to open reactor Heat exchanger has no direct interaction with reacting material (non-integrated in reactor)

Non-condensable gasses cannot negatively affect the rate of hydration/dehydration in the reactor Power output can be characterized by measuring the mass flow rate of gas, flow, or temperature increase of gas over reactor bed.

Potential of cooling with this system, whereby the evaporator/condenser gives the cooling power. The system design/operation is similar as before.

Amount of heat exchanging material is comparable to open systems

Water does not have to be stored in the reactor, thereby increasing the system energy density.

DETAILED DESCRIPTION

Figure 1A:
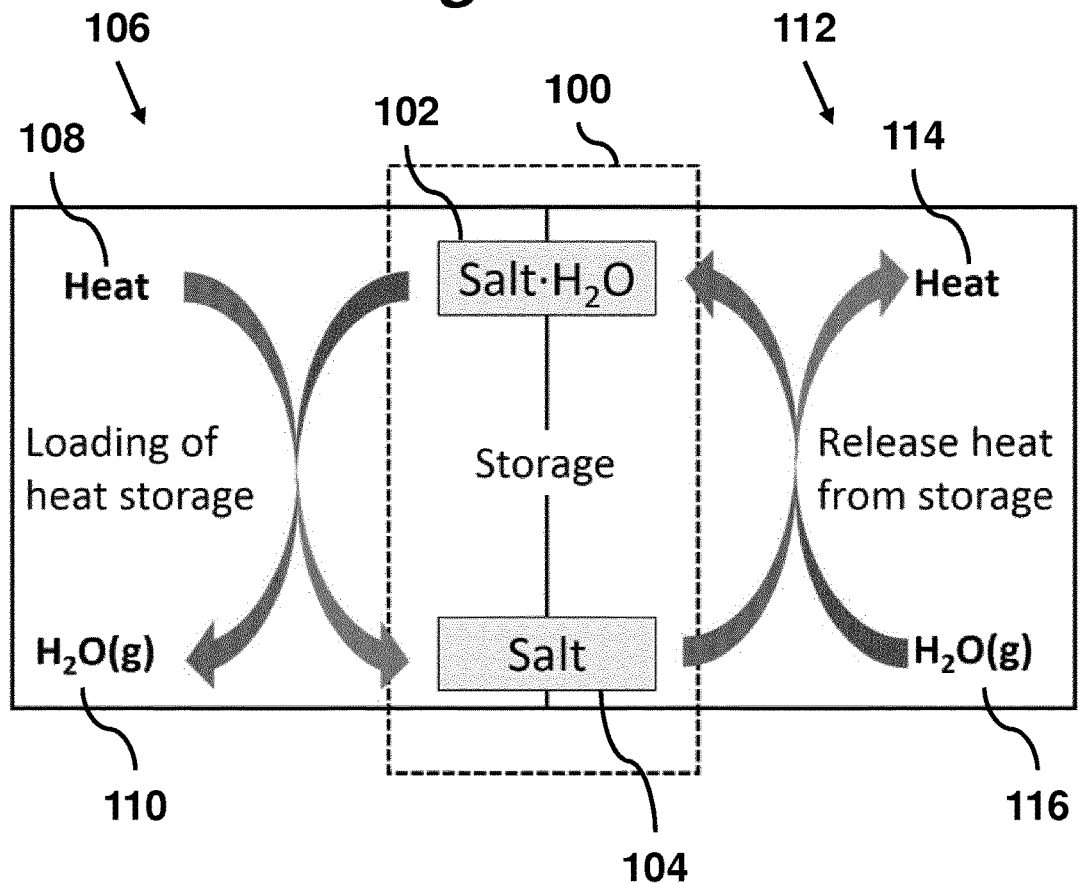
FIG. 1A is a schematic illustration of a TCM heat storage reaction using a salt TCM.
Figure 2:
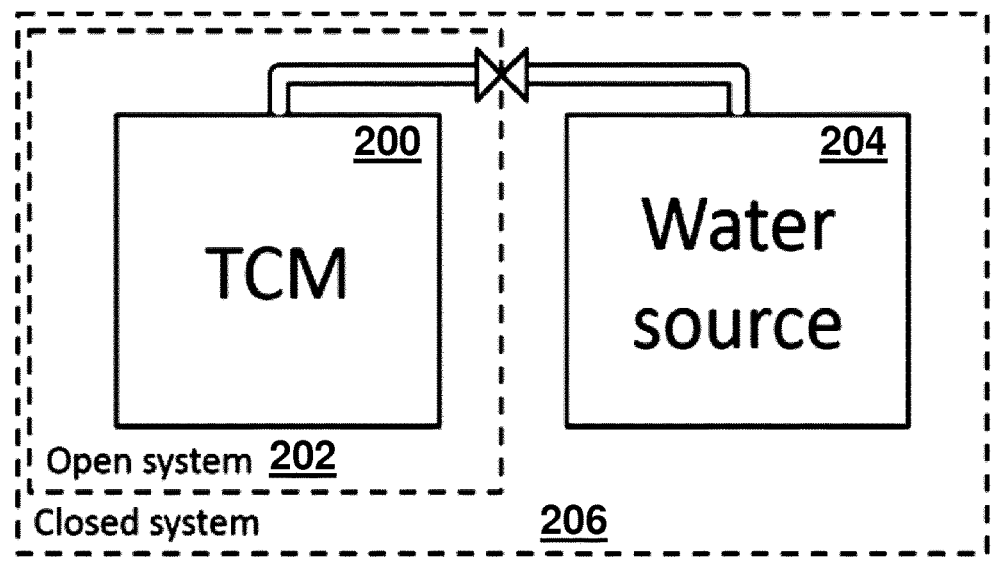
FIG. 2 is a schematic drawing illustrating the difference between conventional open and closed TCM heat storage system designs.
Figure 1C:
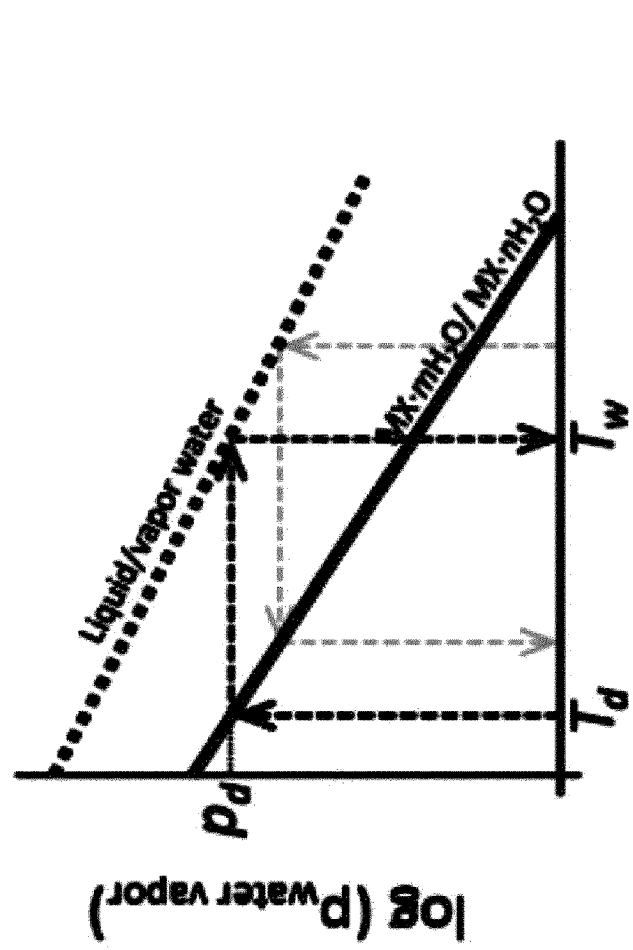
FIGS. 1B and 1C are discharging and charging state diagrams, respectively, for a TCM heat storage reaction of FIG. 1A.
Figure 1B:
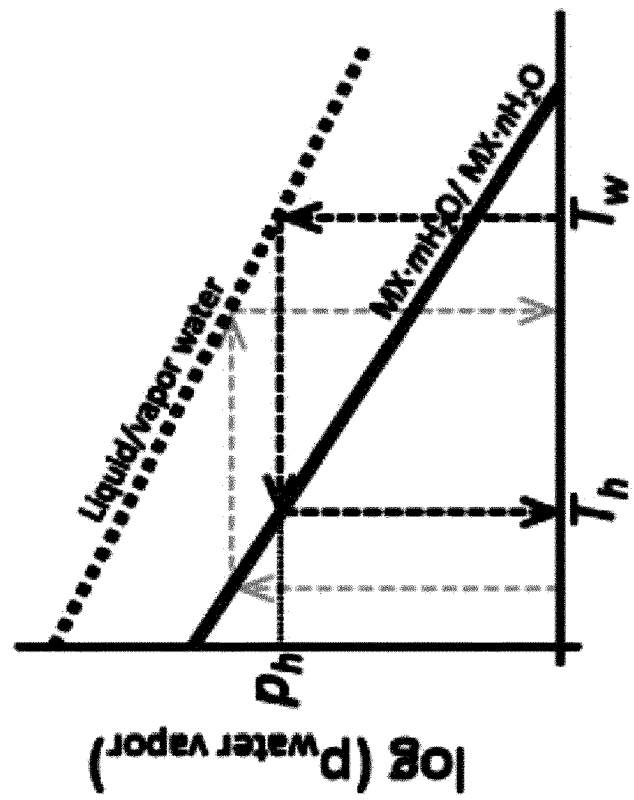

The principles and insights behind embodiments of the invention can be appreciated by first more closely analyzing the conventional closed and open system designs.

A conventional closed system has high demands on its vacuum level and purity of the TCM. A small amount of non-condensable gasses will reduce the power or even stop the hydration or dehydration process in the reactor completely. In addition, a closed system is an expensive technique and has a large environmental footprint as a result of the large amount of material in the heat exchanger.

The main advantages of a conventional closed reactor vacuum system is that the mass transport from the evaporator to the TCM is fast and has an inherent driving force (namely, the vapor pressure difference between evaporator and TCM). Thus, the reactor consumes no energy for the vapor transport during heat production. Secondly, the output temperature of the reactor is not limited by the reactor, but by the TCM and applied vapor pressure. The closed system also has the potential for cooling.

The conventional closed system, however, has the disadvantage that the performance of the reactor decreases dramatically by a non-condensable gasses as these cause gas to accumulate at the condenser as a result of gas flow counterbalancing the driving force. This results in high demands on system (leakage) and material level (outgassing of non-condensable gasses). Additionally, to harvest the heat generated by the TCM, the TCM in the closed system design is in direct contact with the heat exchanger. The heat exchanger should be able to withstand long term exposure of wet salts, and it should be large to contact all the TCM. In general, the demands on the heat exchanger materials are high, which results in high investment costs. Other disadvantages include: Output power is not easily adjusted, reduced energy density as water has to be stored in the reactor and heat exchanging material, maintenance costs are high as the heat exchanger is integrated with the TCM, and large amounts of heat exchanging material negatively affect the durability.

Compared to a closed system, an open storage concept is less demanding on system level, cost effective, but cannot reach high output temperatures, as the heat capacity is too large for the gas delivering the vapor at low water vapor pressures (needed for the reaction to release the heat) to fully heat-up, causing low output temperatures. On the other hand, during dehydration the added heat is insufficient for a complete dehydration. As a result, more air has to be blown through the reactor, which results in higher energy consumption during charging of the TCM system.

For an open atmospheric pressure system, the main advantages are that the heat can be exchanged by an air/air or air/liquid heat exchanger outside the reactor (standard equipment), resulting in low maintenance costs and investment costs, as only a limited amount of heat exchanging materials will be used. An open system also has adjustable output power by controlling the mass flow rate. In addition, part of the outside humidity can be used in the reactor, and water does not have to be stored.

The main drawback of the conventional open system is the limited temperature increase of the gas by passing the reactor bed, which is limited (maximum $\Delta T=26°$ C. in case a cold source of $10°$ C. is used) by the heat capacity of the gas. A different gas flow rate cannot increase this value, as not enough water would be supplied, thus the temperature output is limited by the reactor design, not by the properties of the TCM. Other disadvantages of an open system are energy consumption during heat production by devices used to force circulation of air through the system, and pressure drop over the bed requires significant energy.

In summary, current heat storage system designs have specific shortcomings that hamper the introduction of the heat storage with TCMs, such as energy density, temperature output and system/material demands.

Figure 4:
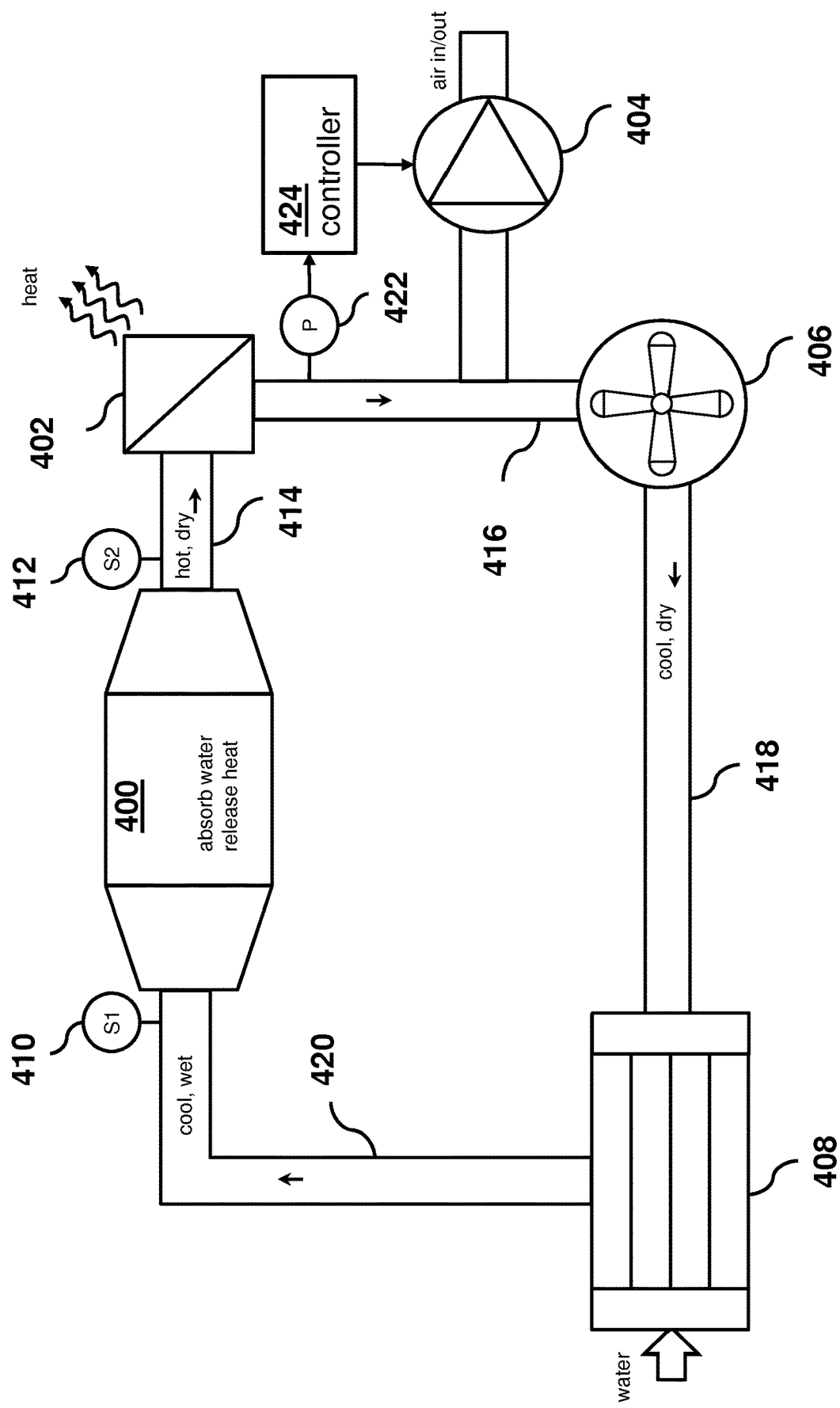
FIG. 4 is a schematic overview of an illustrative embodiment of a hybrid design for a TCM heat storage system during production of heat.

The inventors have discovered a hybrid TCM heat storage design that enjoys many of the advantages of both open and closed systems while avoiding many of their disadvantages. The hybrid design makes use of forced convection and adjustable gas pressure, as illustrated in FIG. 4. A preferred embodiment of the system includes the following components arranged in a closed cycle: TCM reactor bed 400, heat exchanger 402, pressure adjustment pump 404, forced convection fan 406, evaporator/condenser 408, and conduits 414, 416, 418, 420 connecting the components into a closed cycle, as shown. It is noted that the reactor 400 and the heat exchanger 402 are distinct components separated by a conduit rather than being a single integrated component. This separation makes it possible to design the heat exchanger separately from the TCM. Finally this separation will reduce costs as the storage capacity (the amount of TCM in the reactor) is no longer related to the amount of heat exchanger material, what is the case in a closed system. It is also noted that in some embodiments the fan is not needed. For example, the forced convection may be produced by a pressure difference across the reactor, with no fan needed.

The system also includes a sensor 422 for measuring a physical property of the gas, such as pressure or flow, from which the current pressure of the system may be determined directly or indirectly. A controller 424 sends signals to the pump 404 to create a desired system pressure in order to achieve a desired temperature output. The system may optionally include relative humidity sensors 410, 412 positioned on opposite sides of reactor bed 400 for purposes of calibrating the performance of the system.

The following notation will be used in the present description:

| | |
|---|---|
| $\dot{m}_{H_2O,in}$ | Mass flow of water from condenser/evaporator entering the reactor bed (g/s) |
| $\dot{m}_{H_2O,out}$ | Mass flow of water from leaving the reactor bed (g/s) |
| $\Delta \dot{m}_{H_2O} = \dot{m}_{H_2O,out} - \dot{m}_{H_2O,in}$ | Mass uptake of water in reactor (g/s) |
| $\Delta Q_{in}$ | Energy in reactor bed by water uptake/release (W) |
| $\Delta H_{a \to b}$ | Reaction energy of the reaction A + B → A · B (J/mol) |
| $M_i$ | Molar mass of i (g/mol) |
| $\Delta Q_{out}$ | Energy removed from the reactor by the HTM (W) |
| $\dot{m}_{gas}$ | Mass flow of gas (g/s) |
| $C_{p,gas}$ | Heat capacity of gas (J/(g · K) |
| $T_{out}$ | Temperature of gas before entering the reactor bed (K) |
| $T_{in}$ | Temperature of gas after leaving the reactor bed (K) |
| $\Delta T = T_{out} - T_{in}$ | Temperature difference HTM over reactor bed (K) |
| $\Delta P_{H_2O}$ | Water vapor pressure drop over reactor bed (Pa) |
| $\rho_i$ | Density of gas i (g/m³) |
| $P_i$ | Pressure of gas i (Pa) |

We now derive the temperature lift over a reactor bed of the gas blown through the reactor with forced convection, according to principles of the present invention, as follows.

Power generated in the reactor in case $\dot{m}_{H_2O}$ water is absorbed by the reactor:

$$\Delta Q_{in} = \frac{\Delta \dot{m}_{H_2O}}{M_{H_2O}} \cdot \Delta H_{a \to b} = \frac{(\dot{m}_{H_2O,out} - \dot{m}_{H_2O,in})}{M_{H_2O}} \cdot \Delta H_{a \to b}. \quad \text{(eq. 1)}$$

Energy removed from the reactor by the heat transferring medium (HTM):

$$\Delta Q_{out} = \dot{m}_{gas} \cdot C_{p,gas} \cdot \Delta T \quad \text{(eq. 2)}$$

Energy balance over reactor with the assumption that the generated heat in the reactor is absorbed by the gas:

$$\Delta Q_{out} = \Delta Q_{in} \quad \text{(eq. 3)}$$

This result in a temperature increase of the heat transfer gas according to:

$$\dot{m}_{gas} \cdot C_{p,gas} \cdot \Delta T = \frac{\Delta \dot{m}_{H_2O}}{M_{H_2O}} \cdot \Delta H_{a \to b} \quad \text{(eq. 4)}$$

$$\Delta T = \frac{\Delta \dot{m}_{H_2O}}{\dot{m}_{gas} \cdot C_{p,gas} \cdot M_{H_2O}} \cdot \Delta H_{a \to b} \quad \text{(eq. 5)}$$

The relation between mass flow of water and gas is given by:

$$\frac{\dot{m}_{H_2O}}{\rho_{H_2O}} = \frac{\dot{m}_{gas}}{\rho_{gas}}; \dot{m}_{H_2O} = \rho_{H_2O} \frac{\dot{m}_{gas}}{\rho_{gas}} \quad \text{(eq. 6)}$$

The density of water and gas can be calculated according to the following equations with the assumption that we are dealing with ideal gasses:

$$\rho_{H_2O} = P_{H_2O} \cdot M_{H_2O}/(R \cdot T) \quad \text{(eq.7)}$$

$$\rho_{gas} = P_{gas} \cdot M_{gas}/(R \cdot T) \quad \text{(eq.8)}$$

By combining equation 5-8 with the assumption that $\Delta T/T \ll 1$ is temperature rise over the bed is results in the temperature difference of the gas by passing a reactor bed.

$$\Delta T = \frac{-\Delta P_{H_2O}}{P_{gas}} \frac{\Delta H_{a \to b}}{c_{P,gas}(T, P_{gas}) \cdot M_{gas}} \quad \text{(eq. 9)}$$

$$\Delta T = \frac{-\Delta P_{H_2O}}{P_{gas}} C'(T, P_{gas}) l \quad \text{(eq. 10)}$$

We thus find that the temperature lift in a closed-loop reactor may be controlled by adjusting the pressure of the heat transferring medium (HTM). The temperature lift over a reactor bed of the gas blown through the reactor with forced convection is given by:

$$\Delta T = \frac{\Delta P_{H_2O \text{ in reaction}}}{P_{gas}} \frac{\Delta H_{reaction}}{M_{gas} C_{P,gas}(T, P_{gas})},$$

where $\Delta H_{reaction}$ is the reaction energy of the reaction $A+B \to A \cdot B$ (J/mol), $M_{gas}$ is the molar mass of the used gas (g/mol), $C_{p,gas}$ is the heat capacity of the used gas (J/(g·K)), $\Delta P_{H_2O}$ is the water vapor pressure drop over reactor bed (Pa), and $P_{gas}$ is the pressure of the gas (Pa).

Figure 3A:
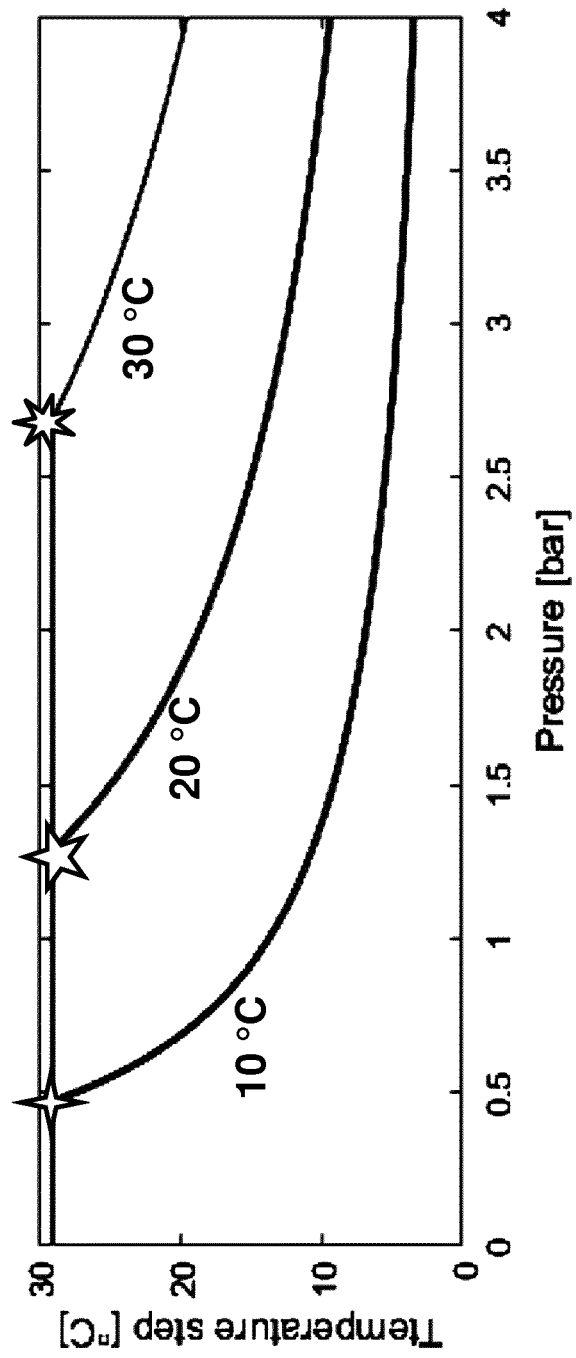
FIGS. 3A and 3B are graphs of temperature and power, respectively, vs. the pressure in a TCM heat storage system, illustrating the effects of the evaporator temperature of the optimal hydration pressure.
Figure 3B:
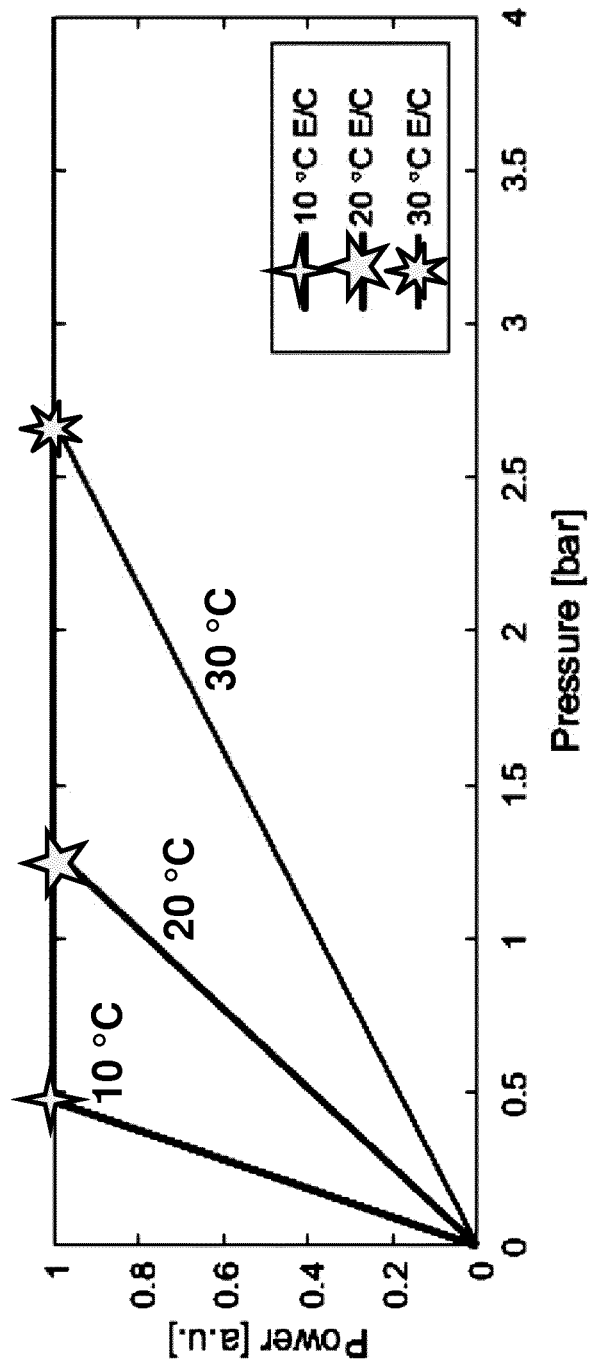

Therefore, controlling the output temperature of the reactor during hydration is possible by:
1. Adjusting the density/pressure of the heat transferring medium (at low water vapor pressures at the inlet of the reactor decreasing the density/pressure, at high water vapor pressures increasing the density/pressure)
2. Selecting a gas with different $C_p$
3. Increasing the water vapor pressure at the inlet, which is limited by cold source During dehydration, the efficiency of the reactor with a constant dehydration temperature can be controlled by:
1. Adjusting the density/pressure of the heat transferring medium (at low water vapor pressures of the TCM decreasing the density/pressure, at high water vapor pressures of the TCM increasing the density/pressure)
2. Selecting a gas with different $C_p$
3. Decreasing the water vapor pressure at the inlet, which is limited by cold source In FIGS. 3A and 3B an example is given of the effects of the evaporator temperature of the optimal hydration pressure. As can be seen, by higher evaporator temperatures a higher pressure in the system will result in optimal performance. Too high pressures result in decreased output temperatures, too low pressures in lower power outputs. The temperature and power in FIGS. 3A and 3B are plotted against the pressure in the system for three evaporator/condenser temperatures with an inlet temperature of 30° C. and limited output temperature of 59° C. The temperature lift at lower pressures is limited by the material properties, which has negative effects on the power output at lower pressures. The stars indicate the optimal conditions in case of temperature and power output for the different E/C temperatures.

Embodiments of the present invention combine features of the open and closed configurations to overcome their disadvantages. A forced convection is used to avoid blocking of the evaporator/condenser or reactor bed by non-condensable gasses. In addition, the water is transported by a reduced pressure of the carrier gas. This increases the temperature step over the reactor bed, as the same amount of energy is supplied, but less mass has to be heated up. The temperature step over the reactor can be controlled actively by adjusting the pressure of the reactor, based on the desired input and output temperature. The relation between desired temperature step and corresponding pressure may be determined during design or calibration by measuring the water vapor content on both sides of the reactor bed.

By way of illustration, and without loss of generality, we consider an example system with seasonal storage capacity of about 7-12 GJ suitable for a West European dwelling based on the passive house standard. This storage capacity is based on an average dwelling in the Netherlands with a floor area of 120 $m^2$, with the passive house standard of 15 kWh/$m^2$ for newly built houses and 28 kWh/$m^2$ in renovated houses.

For the improved heat exchange and mass flow, a forced convection is used (0-30 g $H_2O$/s, depending on the desired power output). The pressure may be varied between 10 mbar and 10 bar, preferably between 200-400 mbar during hydration and 1-2 bar during dehydration, strongly dependent on conditions like evaporator/condenser temperature (water vapor pressure) and dehydration temperatures. The TCM in this example is $K_2CO_3 \cdot 1.5H_2O/K_2CO_3$.

A schematic overview of an illustrative embodiment of the invention during production of heat (i.e., hydration/discharging) is given in FIG. 4. The thermal energy storage system includes the following separate components arranged in a closed cycle: a thermochemical reactor 400 containing a solid thermochemical material, a heat exchanger 402, a fan 406, and an evaporator/condenser 408. These components are connected by gas conduits 414, 416, 418, 420. Fan 406 is understood herein to encompass any device suitable for creating a forced convection of gas, so as to induce the gas to circulate around the close cycle. The system also includes an adjustable pressure control system for actively controlling the pressure of the air/water mixture to produce a desired temperature difference across the thermochemical reactor. The pressure control system includes a vacuum pump 404, a gas property sensor 422 that senses a physical characteristic (such as pressure) of the air/water mixture, and a controller 424 that is configured to control the pressure of the air/water mixture by sending appropriate control signals to the pump 404, based in part on measurements from the gas property sensor 422. The pressure of the air/water mixture is adjusted to an underpressure during a hydration phase and an overpressure during a dehydration phase. The underpressure is selected to be a pressure above 10 mbar and below 1 bar, while the overpressure above is selected to be a pressure above 1 bar and below 10 bar. The particular underpressure value and overpressure value are determined from a desired temperature drop.

The relationship between the desired temperature drop and the corresponding system overpressure and underpressure may be determined during system design and/or calibration using two relative humidity sensors 410, 412 positioned on opposite sides of the thermochemical reactor 400. The relative humidity sensors 410, 412 are not necessary components of the system, as they are not needed once the system design has been fixed.

Operation of the closed cycle thermal energy storage system, includes determining from the gas property sensor a pressure of an air/water mixture circulating in the system, and actively controlling the pressure of the air/water mixture to produce a desired temperature difference across the thermochemical reactor. Gas (e.g., air, $N_2$, other carrier) is circulated in the reactor by forced convection induced by fan 406. This gas will pass evaporator/condenser 408 to control the vapor pressure at the inlet of the reactor bed 400. In the reactor, the water will be absorbed by the TCM and heat will be released. The produced heat will be transported with the gas to heat exchanger 402. The pressure in the reactor can be adjusted at any time to a desired value with an extra inlet and outlet pump 404. The pressure is selected to a value to achieve desired temperature and power output of the reactor.

Following is a summary of the system operation during charging, when heat is stored. The gas flows from the heat exchanger to the TCM reactor to the evaporator/condenser, to the fan, and back to the heat exchanger.

1. Heat is transported into the reactor bed. Therefore, air is first blown through the heat exchanger to heat up, then passes through the reactor.
2. Water will be removed from the bed and dehydrate the TCM.
3. The air will take up a certain amount of water which will be released by passing it through the evaporator/condenser unit.

Following is a summary of the system operation during discharging, when heat is recovered. The gas flows from the heat exchanger to the fan, to the evaporator/condenser, to the TCM reactor, and back to the heat exchanger.

1. The airflow is wetted by the evaporator/condenser.
2. Water is transported to the reactor bed. The added water is adsorbed by the reactor bed, during this process heat is released
3. The heat is transported by the air into the heat exchanger, where it will be harvested.

The following specifications illustrate a particular example of a particular system design, and are dependent on the demanded power.

1. A reactor bed 400: A volume where the TCM is located and a volume flow can pass through for wetting and drying of the TCM. Pressure drop over the bed is preferably less than 1000 Pa (10 mbar), in order to drive the flow through the bed.
2. A heat exchanger 402 (air/air; air/liquid; air/(liquid/air)) is included to remove or add heat from/to the airflow inside the reactor to/from an external air or liquid flow. The power range may be, for example, between 0.1-10 kW.
3. Fan 406 for forced convection through the reactor. The volume flow of this fan strongly depends on the demanded power output of the reactor. I.e., for 1 kW the volume flow is in the order of 40 l/s by 100% efficiency. Preferably the fan can create flow in forward and backward direction, as for charging the TCM the air should be heated before it enters the reactor bed and for discharging the air should be wetted before it enters the reactor bed. For example, 0-3000 m³/h for 0-4 kW application, preferably between 0 and 576 m³/h (40*3600*4 dm³/h) with 100% efficiency for 4 kW applications.
4. An evaporator/condenser 408 is located between the air fan and reactor bed to control the water vapor pressure. During heat charging (dehydration) the partial water vapor pressure will be reduced at the condenser and during discharging the partial water vapor pressure will be increased. Different types of evaporator/condensers can be used, for example dynamic (i.e. free falling film evaporator/condenser) and static (i.e. liquid water surface). Example power is 0.1-10 kW.
5. Vacuum pump/pressure pump 404 for controlling the overall pressure within the system. The vacuum pump preferably is able to control the pressure inside the system between 10 mbar and 10 bar at roughly 0.2 bar/m³ per hour.
6. Optionally, the system may include two RH sensors 410, 412 to measure the humidity before and after the TCM reactor. This information is important during calibration and/or design to determine the temperature lift for a given pressure. The sensors preferably are able to work between 20-120° C.
7. A pressure sensor 422 measures the total pressure of the system for use by controller to control the vacuum pump to achieve appropriate pressure to produce desired temperature drop. Pressure sensors may also be included optionally on both sides of the TCM reactor for determining when maintenance is needed (as the pressure drop is above a certain level) and if the expected pressure drop is present (range 1 mbar-10 bar).

Figure 5:
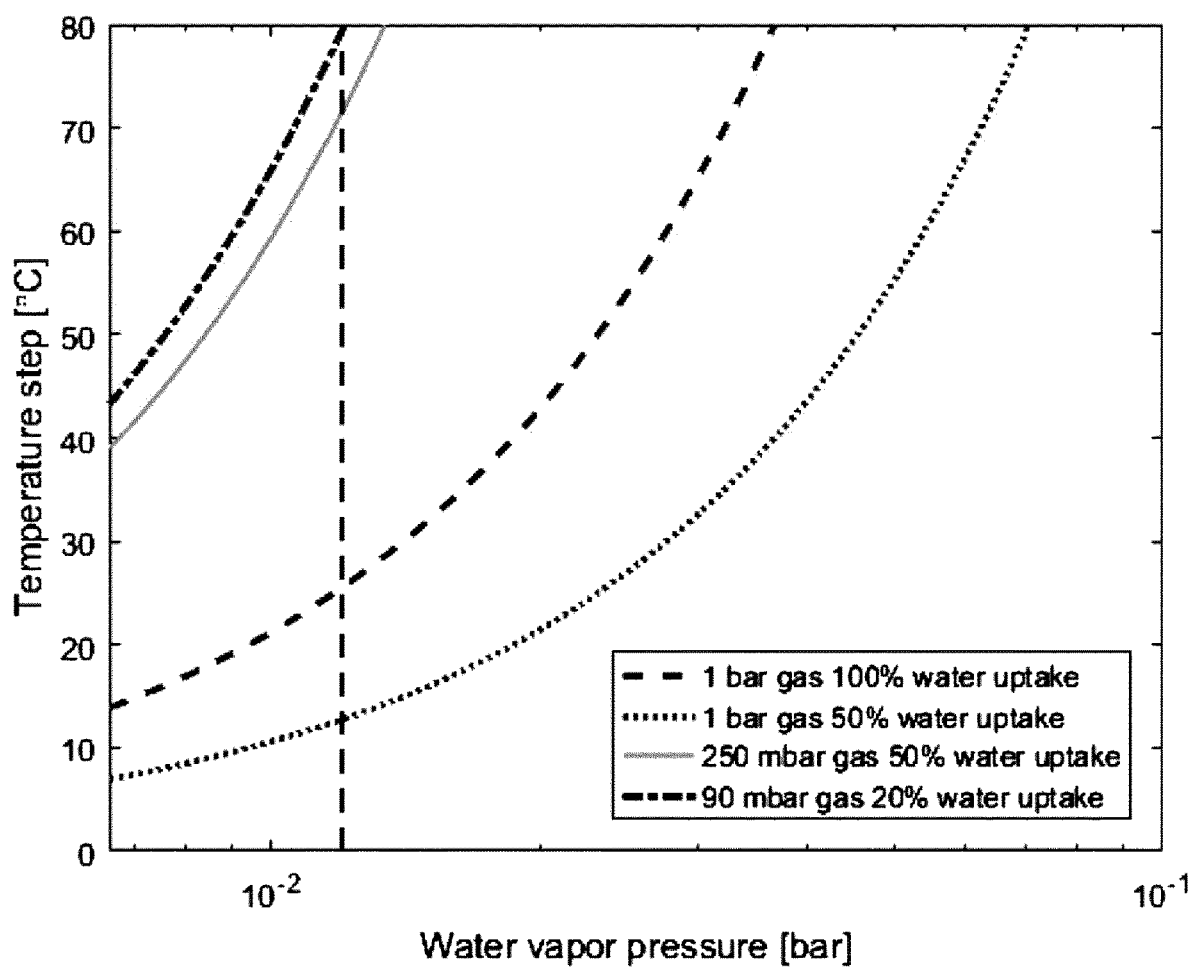
FIG. 5 is a graph of temperature step across the TCM reactor bed vs water vapor pressure, illustrating the effect of reduced gas pressure on the temperature step.

FIG. 5 is a graph of the effect of reduced gas pressure in the closed cycle reactor on the $\Delta T$ for different water vapor pressures and efficiency of water uptake in the reactor bed. Efficiency is calculated by $\Delta P_{H_2O}/P_{H_2O,in}$. In this figure the system uses air as gas and $K_2CO_3$ as TCM.

Figure 6A:
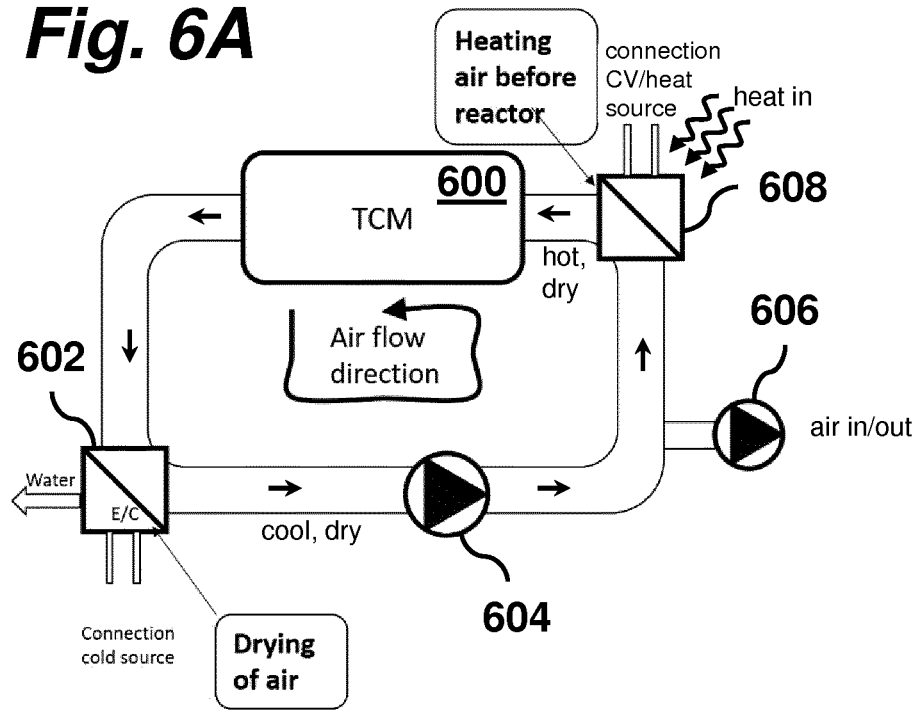
FIGS. 6A and 6B are a schematic diagrams of a semi-closed TCM heat storage system during charging and discharging, respectively.
Figure 6B:
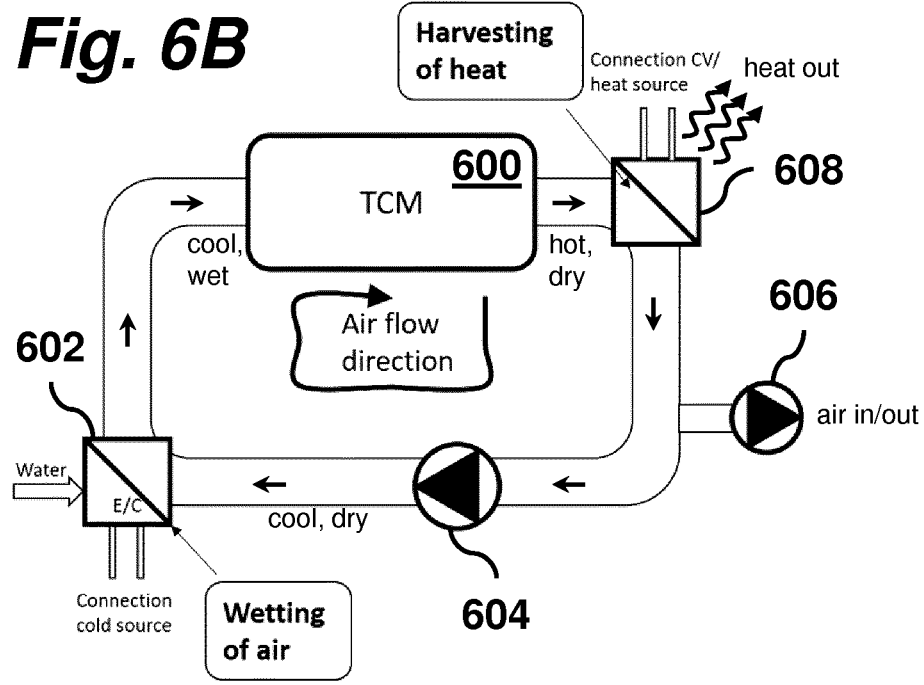

FIG. 6A-B is a schematic overview of charging and discharging of a semi-closed system. During charging (FIG. 6A), air circulates around counter-clockwise in a closed cycle from TCM 600 to evaporator/condenser 602 to fan 604 to heat exchanger 608 and back to TCM 600. During discharging (FIG. 6B), the flow direction is reversed to clockwise. The pressure within the system is controlled with a pump 606. During discharging of the system, the pressure inside will in most cases be smaller than 1 bar. During charging of the system, the pressure inside will in most cases be increased above 1 bar. At starting of charging/discharging the TCM heats up, which means that the efficiency of the reactor material changes. At this moment, the pressure inside the system will be tuned, such that the reactor will perform optimal and finally will reach a constant pressure. Targeted leakage rate of the system is max 1 mbar a day. Other features of this example system include:

Evaporation heat will not be lost by incomplete discharging.

A cold source is used; no advantage of wet air outside during discharging or dry air outside during charging.

Fan is preferably able to run in both directions (e.g., can be solved by tubing).

Only 4 liquid connections from the system to the already present heating installation.

A fan is used with high volume flow.

A vacuum/pressure pump is used, low volume flow.

In case water is not stored but supplied and distracted from system during running, the water is preferably deionized. At high pressure releasing water is easy, but a low pressure a second compartment is necessary to release the water. (Dehydration will in generally be performed at high pressures and hydration at low pressures, what simplifies this 'problem'.)

Figure 7A:
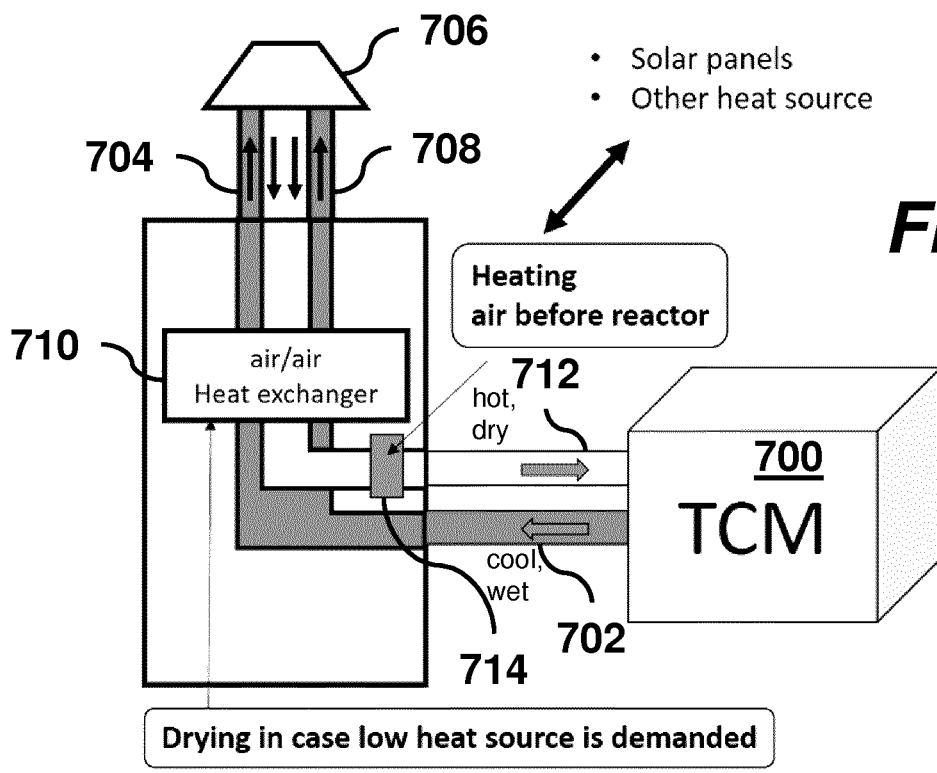
FIGS. 7A and 7B are a schematic diagrams of a semi-open TCM heat storage system during charging and discharging, respectively.
Figure 7B:
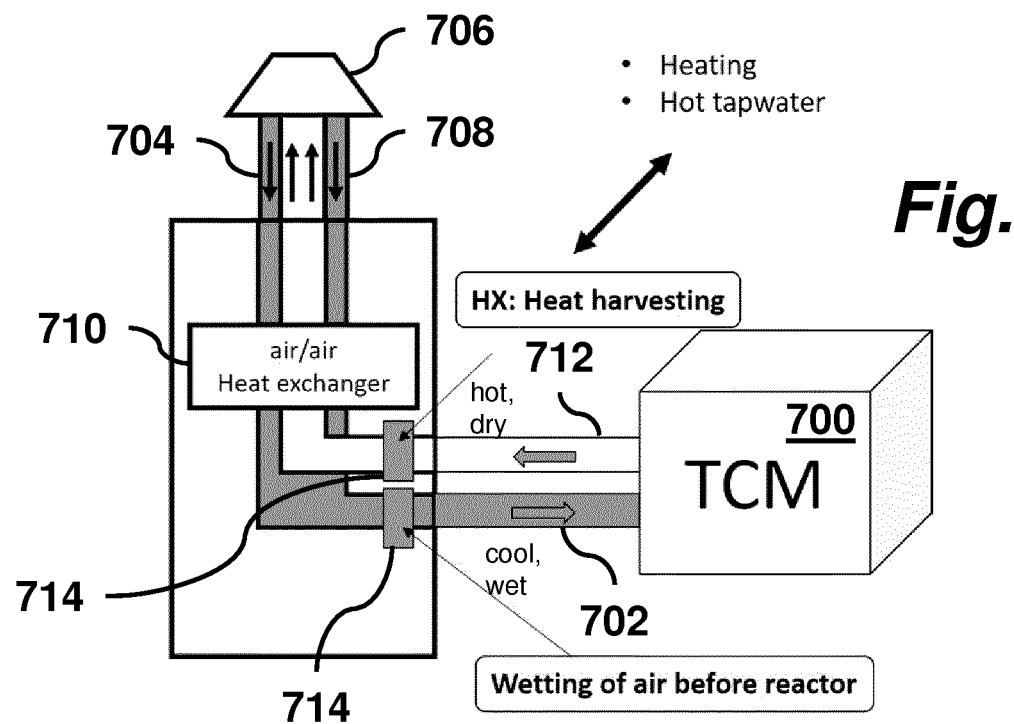

FIG. 7A-B is a schematic overview of charging and discharging of a semi-open heat storage system. During charging (FIG. 7A), air is circulated in an open cycle from the inlet 706, to air/air heat exchanger 710 to a heat exchanger 714 and then through tubing 712 to the TCM 700. From TCM 700 the gas flows through tubing 702 back to the air/air heat exchanger 710 and the outlet 704, 708. During discharging (FIG. 7B), the flow direction is reversed, so that

706 becomes an outlet and 704, 708 become inlets. The pressure within the system is controlled with a pump at the inlet 706. During discharging of the system, the pressure inside will in most cases be smaller than 1 bar. During charging of the system, the pressure inside will in most cases be increased above 1 bar. At starting of charging/discharging the TCM heats up, which means that the efficiency of the reactor material changes. At this moment, the pressure inside the system will be tuned, such that the reactor will perform optimally, and finally will reach a constant pressure. The forced convection in this embodiment will be a result of pressure drop in the system and the pump at the inlet. Specifically, the reactor functions as a device to induce forced convection.

In a semi open system, the air is refreshed with outside air. Therefore the incoming air will have a vapor content equal to the outside conditions. The flow within the system can be controlled with a fan and the pressure within the system by varying the outflow and inflow conditions with a pump. During discharging of the system, the pressure inside will in most cases be smaller than 1 bar. During charging of the system, the pressure inside will in most cases be increased above 1 bar. At starting of charging/discharging the TCM has to heat up, which means that the efficiency of the reactor material is different. At this moment the pressure inside the system will be tuned, such that the reactor will perform optimal and finally it will reach a constant pressure.

Part of the demanded vapor pressure will be delivered by outside air.

Efficiency drops in case not all added water will be absorbed by passing the TCM reactor and will blow out into the surroundings. In case the air/air heat exchanger also will exchange the humidity this issue is solved.

No additional fan is necessary.

Only 2 air connections from the system to the already present heating installation.

A vacuum/pressure pump is used, with high volume flow.

Control Algorithm

The following control algorithm can be used to characterize and calibrate a particular system to determine overpressure and underpressure values for desired temperature drops.

Hydration:
System Limits:
Water vapor content by inlet of reactor bed.
Maximum TCM temperature with help of water vapor content by inlet of reactor bed.
Min/max pressure of the setup (10 mbar to 10 bar).
Demanded inlet temperature at heat exchanger.
Temperature drop over heat exchanger/temperature lift over reactor bed.
Algorithm:
1. Measure the RH before and after the reactor bed.
2. Based on the RH, the drop in water content ($\Delta P_{H2O}$) can be calculated.
3. With help of the following equation the desired $P_{gas}$ can be calculated based on the desired $\Delta T$ over the bed:

$$P_{gas} = \frac{|\Delta P_{H_2O}|}{|\Delta T|} \frac{\Delta H_{a \rightarrow b}}{C_{P,gas}(T, P_{gas}) \cdot M_{gas}}.$$

4. Measure the $\Delta T$ over the bed with the RH sensors
5. In case $\Delta T$ is smaller than expected, the pressure of the reactor should be decreased. If the temperature step is larger than demanded increase the pressure of the reactor.
6. As $\Delta P_{H2O}$ can be affected by a different $\Delta T$, or state of TCM, step 1 till 5 is repeated indefinitely.

Dehydration:
System Limits:
Water vapor content by inlet of reactor bed.
Minimum TCM temperature for dehydration at certain vapor pressure.
Min/max pressure of the setup (10 mbar to 10 bar).
Available dehydration temperature at heat exchanger.
Temperature increase over heat exchanger/temperature drop over reactor bed.
Algorithm:
1. Measure the RH before and after the reactor bed
2. Based on the RH, the increase in water content ($\Delta P_{H2O}$) can be calculated.
3. With help of the following equation the desired $P_{gas}$ can be calculated based on the desired $\Delta T$ over the bed:

$$P_{gas} = \frac{|\Delta P_{H_2O}|}{|\Delta T|} \frac{\Delta H_{a \rightarrow b}}{C_{P,gas}(T, P_{gas}) \cdot M_{gas}}$$

4. Measure the $\Delta T$ over the bed with the RH sensors
5. In case $\Delta T$ is smaller than expected, the pressure of the reactor should be decreased. If the temperature step is larger than demanded increase the pressure of the reactor.
6. As $\Delta P_{H2O}$ can be affected by a different $\Delta T$, or state of TCM, step 1 till 5 is an infinite loop.

Once a system has been calibrated and characterized, the RH sensors are not needed. The pressure can be controlled to reproducibly create a desired temperature drop, e.g., using an empirical formula relating desired temperature to pressure, or a lookup table.

The invention claimed is:

1. A closed-cycle thermal energy storage system comprising:
a thermochemical reactor containing a solid thermochemical material,
a heat exchanger,
an evaporator/condenser,
conduits connecting the thermochemical reactor, the heat exchanger, and the evaporator/condenser to allow convection of an air/water mixture circulating around a closed cycle, and
a pressure control system for actively controlling the pressure of the air/water mixture to produce a desired temperature difference across the thermochemical reactor; wherein the pressure control system comprises a pressure sensor, a controller, and an inlet/outlet pump, wherein the controller is configured to adjust the pump to create a desired system pressure based in part on measurements from the pressure sensor.

2. The thermal energy storage system of claim 1 wherein the pressure control system controls the pressure of the air/water mixture to a first pressure during a hydration phase and a second pressure during a dehydration phase.

3. The thermal energy storage system of claim 2 wherein the first pressure and the second pressure are overpressures between 1 bar and below 10 bar.

4. The thermal energy storage system of claim 2 wherein the first pressure is an underpressure in the range 10 mbar to 1 bar and the second pressure is an overpressure in the range 1 bar to 10 bar.

5. The thermal energy storage system of claim 1 wherein the thermochemical material is a material selected from salts (hydrates/ammoniates/methanol complexes), molecular sieves (zeolites), metal organic frameworks (MOFs), silica-gel, or activated alumina.

6. The thermal energy storage system of claim 1 further comprising a gas property sensor that senses a physical characteristic of the air/water mixture, wherein the adjustable pressure control system controls the pressure of the air/water mixture based in part on measurements from the gas property sensor.

7. The thermal energy storage system of claim 6 wherein the gas property sensor is a pressure sensor.

8. The thermal energy storage system of claim 1 further comprising two relative humidity sensors positioned on opposite sides of the thermochemical reactor, wherein the pressure control system controls the pressure of the air/water mixture based in part on measurements from the two relative humidity sensors.

9. The thermal energy storage system of claim 1 wherein the thermochemical reactor and the heat exchanger are distinct components.

10. The thermal energy storage system of claim 1 further comprising a fan connected to the conduits to force convection of the air/water mixture circulating around the close cycle.

\* \* \* \* \*